Dec. 26, 1961     A. R. TROTT     3,014,696
TREE JACK
Filed Aug. 24, 1959
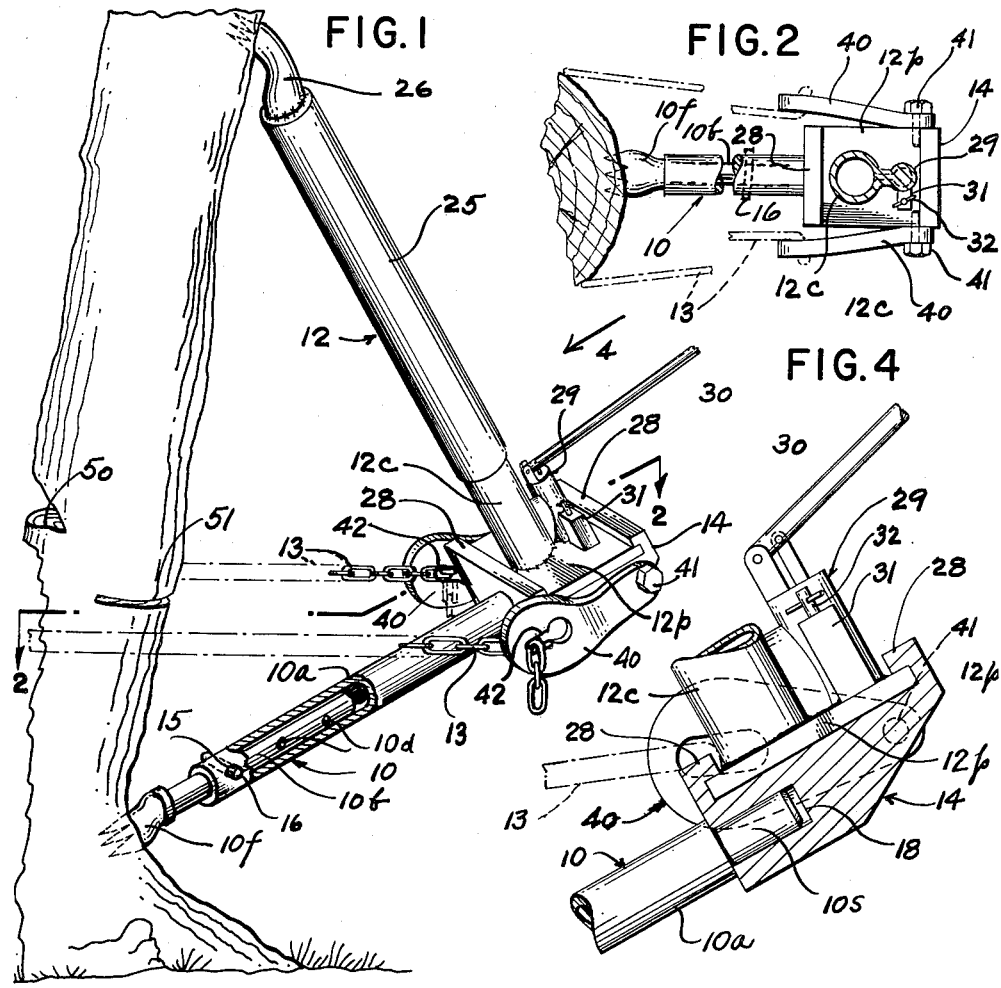
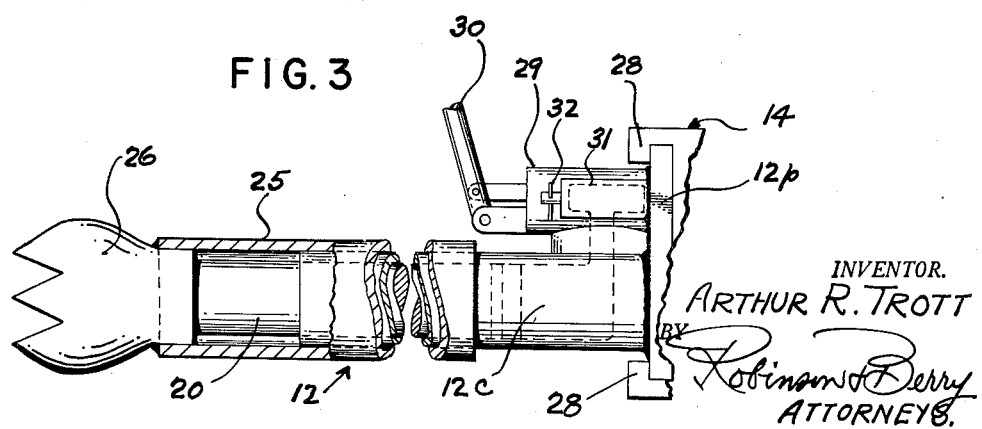
INVENTOR.
ARTHUR R. TROTT
BY
Robinson Berry
ATTORNEYS.

United States Patent Office 3,014,696
Patented Dec. 26, 1961

3,014,696
TREE JACK
Arthur R. Trott, Box 212, Hope, Idaho
Filed Aug. 24, 1959, Ser. No. 835,598
3 Claims. (Cl. 254—93)

This invention relates to devices of those kinds that are most generally referred to, in the industry to which they pertain as "tree jacks," "tree tippers" or "tree controllers," as used in tree falling operations to control the direction of fall of the trees as cut free from their stumps; such devices being especially useful where it is desirable, or necessary, that the direction of fall of the tree be accurately controlled.

It is the principal object of this invention to provide an improved form of "tree jack" or "tree controller" whereby the direction of fall of a tree may be controlled easily and with accuracy. Furthermore, to provide a device of this character that is easily applied and readily useable with trees of various diameters; this type of device being especially useful and desirable in the falling of the tall trees of the northwest States of the Union where growing along power lines, rail lines and on river banks.

It is a further object of this invention to provide a tree jack that comprises readily disconnectable parts that may be disassemblied and then easily carried from tree to tree or from place to place and there easily and readily reassembled for use.

Yet another object of this invention is to provide a device of the character above disclosed employing a hydraulic jack cylinder that is sufficiently powered by the hand pumping of a hydraulic pressure medium into it to perform its function.

Still further objects and advantages of the present invention resides in the details of construction of its parts; in their combination and in the mode of operation and use of the device, as will hereinafter be fully described.

In accomplishing the above mentioned and other objects of the present invention, I have provided the improved details of construction, the preferred forms of which are illustrated in the accompanying drawings, wherein:

FIG. 1 is a view illustrating the mode of application of the present tree jack to a tree to control the direction of its fall when cut free from its stump.

FIG. 2 is a cross-section on line 2—2 in FIG. 1.

FIG. 3 is an enlarged sectional detail of the lower end portion of the jack cylinder and its mounting block.

FIG. 4 is a view of the jack as seen when looking in the direction of arrow 4 in FIG. 1.

Referring more in detail to the drawings: In the present illustration, the device is shown as applied to a tree which may be from 10 to 16 inches in diameter. However, the tree diameter is not of any material consideration. The mode of application of the device and its use is the same regardless of tree diameter or height.

In FIG. 1, the device is shown to comprise a lower end supporting leg, designated in its entirety by reference numeral 10. This leg will hereinafter be referred to as the "base leg." The device also comprises an upper leg, which in FIG. 1, is designated in its entirety by numeral 12. This will hereinafter be referred to as the "jack leg." Also, the device comprises a tie chain 13 which is applied about the tree stump, just below the level where the cut is to be made therein to fall it and which chain is adjustably secured at its ends to a jack mounting block 14 which, in turn, is mounted on the upper end of the base leg 10.

The base leg 10 comprises a tubular upper end section 10a and a telescopically adjustable lower end section 10b formed at its lower end with a laterally widened and shapened foot 10f that is pronged across its lower edge for gouging into the tree stump to better insure proper supporting of the device for use. The part 10b is transversely bored, as at 10d, at spaced intervals therealong and the tubular upper end section is bored as at 15 to receive a locking pin 16 selectively through any one of the holes 10d as in FIG. 1, to secure the leg length adjustment desired or required. At its upper or outer end, the leg 10 is formed with a block mounting stem 10s, coaxially thereof, adapted to be removably fitted within a socket 18 formed in the block 14 thus to secure the block rigidly and properly on the upper end of the leg.

The "jack leg" 12, is in effect a hydraulic jack of usual design comprising a hydraulic cylinder 12c to the lower end of which a base plate 12p is welded. This base plate is perpendicular to the axial line of the jack cylinder and is adapted to be seated flatly against the flat top wall surface of the base block 14. A piston rod 20 is reciprocally contained in the jack cylinder and is extendable upon the application of hydraulic pressure medium to the inner or mounting end of the cylinder and retracts with the release of the pressure. Telescoped over the jack cylinder and outer end portion of the piston rod 20 is a sleeve 25, which, at its outer end is closed by and carries a toothed shoe 26, welded therein and adapted to holdingly engage with the tree trunk above the level of the falling cut to be made therein as has been illustrated in FIG. 1.

The block 14 on and against which the jack cylinder is supported has a flat top surface against which the plate 12p at the lower end of the cylinder is flatly seated. The upper and lower edges of plate 12p are slidably received between flanges 28—28 that are provided along top and lower edges of the block to hold the jack properly in place.

The jack cylinder also is equipped with a hand pump 29 of the usual kind having a hand lever 30 operable to force the employed fluid pressure medium into the lower end of the jack cylinder thus to extend the piston which, in turn, acts against the sleeve 25 to extend it to tip the tree accordingly. A check valve 31 is incorporated in the jack to hold the pressure in the cylinder, and this valve has a manual adjustment means, as at 32, to release the pressure medium for return from the cylinder to its storage reservoir in the pump.

To use this device, it is applied to a tree as follows: First the base leg 10 is set in position by gouging the shoe 10f at its lower end into the base of the stump. Then the block 14 is applied to the outer end of this leg. The leg 10 is then supported in the inclined position of use by the application of the tie chain 13. This is wrapped one or more times about the tree stump as in FIG. 1 and its opposite ends are extended to opposite sides of the block 14 and secured thereto. For this securement, the block is equipped at opposite sides with anchor plate 40—40 pivoted thereto by pivot bolts 41—41. The plates are formed with slots 42 through which the chain ends may be passed and then adjustably secured, as has been illustrated.

The jack leg 12 is then set in position by sliding its base plate 12p between the flanges 28—28 on block 14 and the outer end shoe of the jack sleeve 25 is gouged into the tree trunk.

It is further to be explained that, prior to or even after the tree jack has been applied, the tree is formed with an under cut, as at 50 in FIG. 1, and also the saw cut 51, for falling the tree may be started. The chain is applied about the tree at a level that is below the location of the saw cut 51.

With the jack in place, pressure is applied by pumping fluid into the jack. The cut 51 is then continued and as it progresses, the jack leg is extended accordingly. The jack in this way effects the tipping and falling of the tree in the desired direction which will be directly opposite the direction of application of force by the jack.

When the saw cut 51 is sufficiently deep, the tree will fall, leaving the stump in the ground.

When the tree falls, the jack still retains its position under its own weight and it can then be readily disassembled for transportation to its next place of use.

Modifications in size, proportions of parts employed in the jack, may be made without departing from the spirit of the invention.

Furthermore, it is apparent that provision for adjustment of the length of leg 10 and adjustment of the chain ends in their connection with plates 40—40 permits the application and use of the device with trees of various diameters.

What I claim as new is:

1. A tree tipping device comprising a substantially rectangular block, said block having a socket formed in a vertical face thereof, parallel flanges formed along two edges of the top surface of said block, pivotally mounted anchor plates secured to said block on the sides thereof normal to said vertical face, a flexible tie adjustably secured to said anchor plates, a base leg member having one end thereof removably positioned in said socket, a jacking mechanism removably applied to said block, said jacking mechanism comprising a rectangular plate removably positioned between said flanges, a hydraulic hand pump mounted on said plate, a hydraulic jack cylinder mounted on the plate adjacent to and interconnected with said pump and a sleeve movably mounted on said jack cylinder at the outer end thereof.

2. A tree tipping device as in claim 1 including a check valve interconnected with said hand pump to maintain the pressure in said jack cylinder and said valve being adjustable to release the pressure.

3. A tree tipping device as in claim 1 wherein said base leg is adjustable in length.

References Cited in the file of this patent

UNITED STATES PATENTS

| | | |
|---|---|---|
| 396,738 | Foulke | Jan. 29, 1889 |
| 2,596,976 | Barber | May 20, 1952 |

FOREIGN PATENTS

| | | |
|---|---|---|
| 695,239 | Germany | Aug. 20, 1940 |